H. C. PARKER.
APPARATUS FOR RECOVERING METAL FROM BLAST FURNACE DUST.
APPLICATION FILED NOV. 15, 1910.
987,739.
Patented Mar. 28, 1911.
2 SHEETS—SHEET 1.
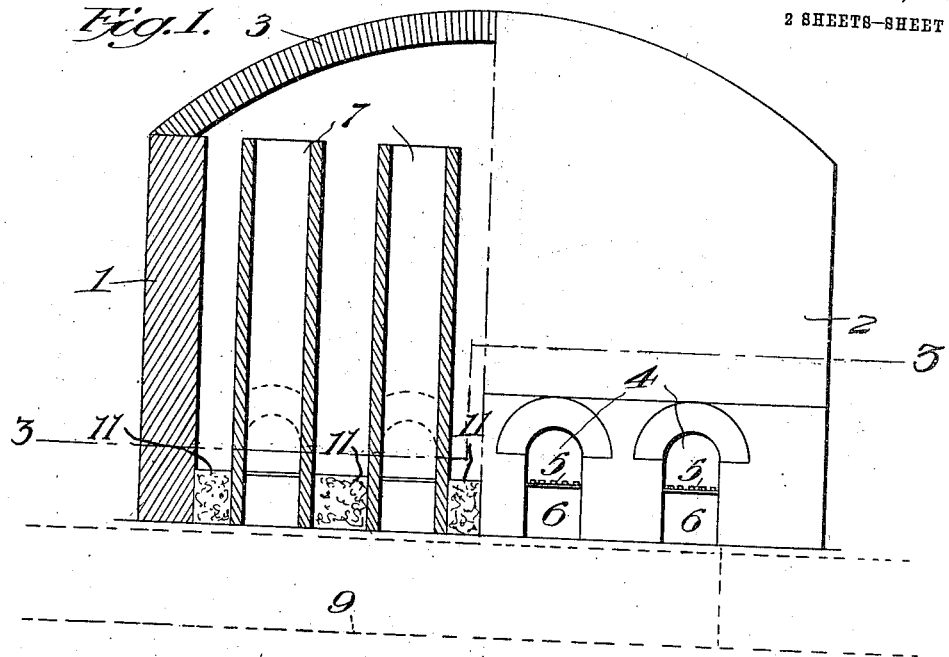
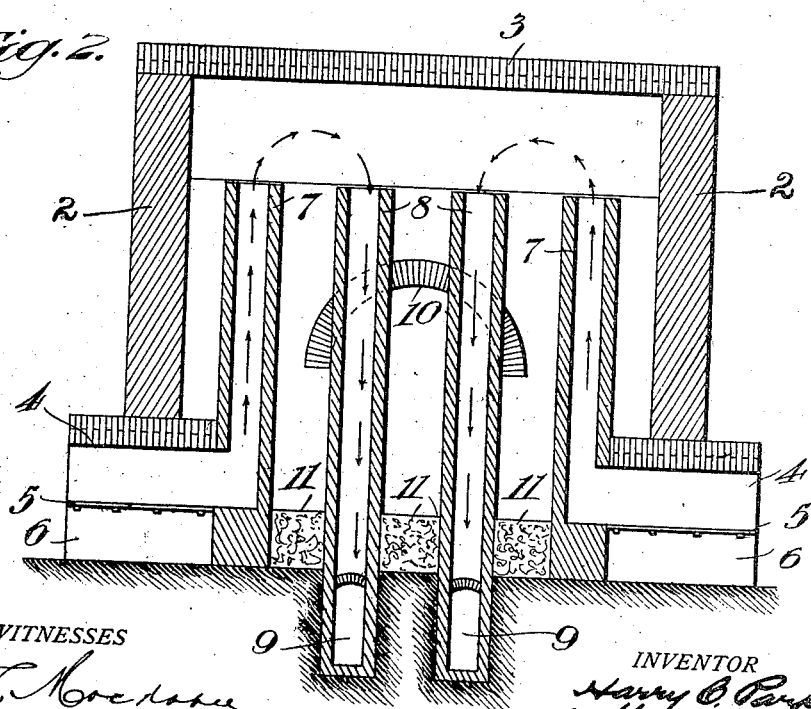
WITNESSES
INVENTOR H. C. PARKER.
APPARATUS FOR RECOVERING METAL FROM BLAST FURNACE DUST.
APPLICATION FILED NOV. 15, 1910.
987,739.
Patented Mar. 28, 1911.
2 SHEETS—SHEET 2.
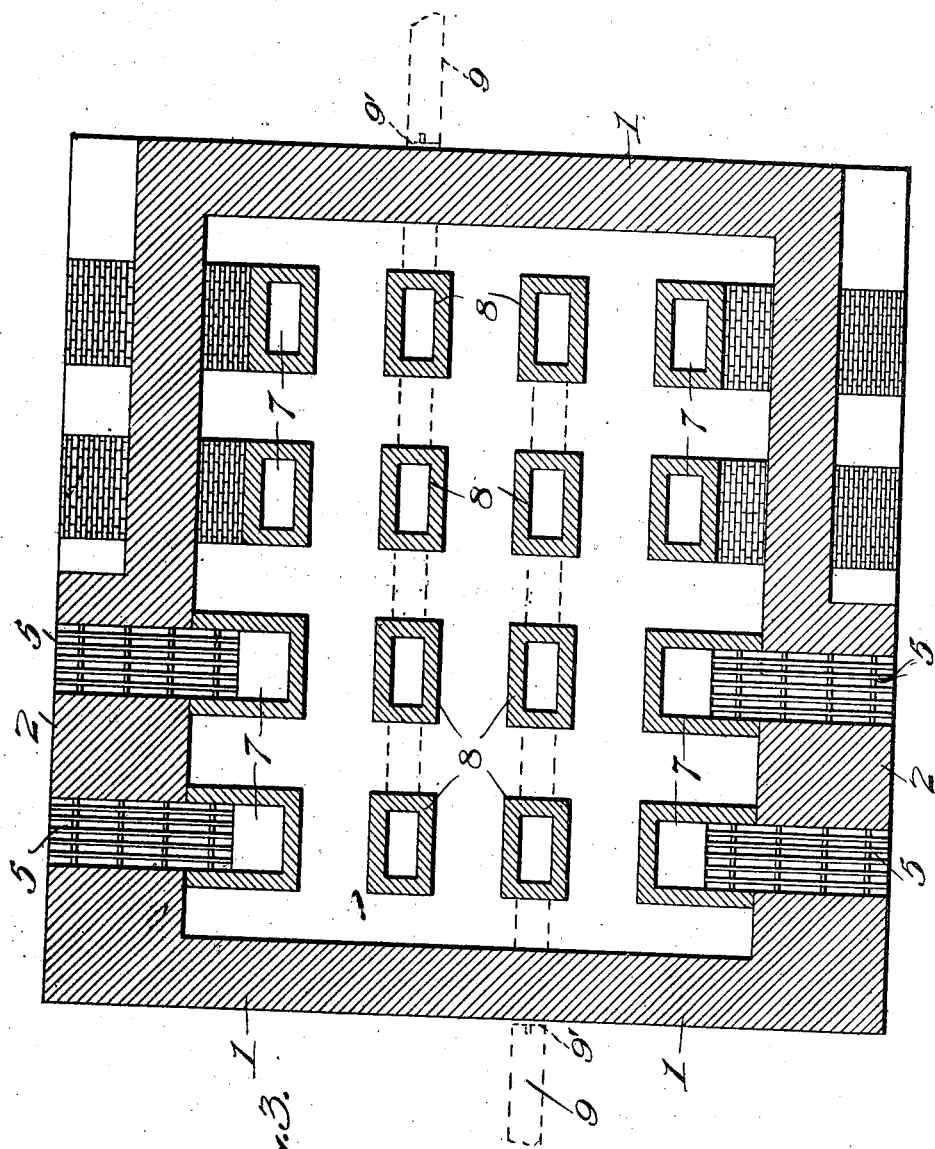

UNITED STATES PATENT OFFICE.

HARRY C. PARKER, OF IRONTON, OHIO.

APPARATUS FOR RECOVERING METAL FROM BLAST-FURNACE DUST.

987,739.

Specification of Letters Patent. Patented Mar. 28, 1911.

Application filed November 15, 1910. Serial No. 592,496.

*To all whom it may concern:*

Be it known that I, HARRY C. PARKER, a citizen of the United States, residing in Ironton, in the county of Lawrence and State of Ohio, have invented certain new and useful Improvements in Apparatus for Recovering Metal from Blast-Furnace Dust, of which the following is a specification.

The present invention relates to an apparatus for recovering the metal contained in the dust expelled from blast furnaces when such furnaces are opened for charging.

During the operation of blast furnaces those lighter particles or dust of the ore to be reduced which do not reach the sphere of the boshes are, through the pressure incident to the blast, blown out of the furnace through the "down-comer" and into a suitable receiver. At appropriate periods the contents of these receivers are removed and subjected to a caking or briqueting process for conditioning the material to be worked under the blast. Thus far this feature of ore reduction is satisfactorily taken care of, but when the bell-hopper is opened for charging the furnace there is blown out a considerable quantity of the ore bearing dust incident to the great pressure within the furnace and heretofore the recovery of metal contained in this product has been neglected.

It is therefore the purpose of the present invention to recover this element and condition the same for treatment through the regular blast furnace action.

Summarily stated the invention consists in certain means for subjecting the ore bearing dust to the heating action of an intense flame, but out of direct contact therewith, whereby to not disturb the material, which, as just stated is in a too finely divided condition to withstand the blast; but to cause the metallic particles existing in the dust to sinter and adhere.

The accompanying drawings disclose the apparatus and in the several views shown therein: Figure 1 is a side elevation of the kiln partly in section. Fig. 2 is a vertical sectional view thereof taken at right angles to the view shown in Fig. 1, and Fig. 3 is a plan view in section taken on the line 3—3 of Fig. 1.

Referring to the structure in further detail, 1 and 2 designate the end and side walls of the kiln, and 3 the arched roof thereof, and within the side walls 2 are arranged a series of fire-places 4 having the usual grates 5 and ash-pits 6. The fire-places 4 are extended well within the kiln chamber and have each a vertically disposed flue 7. The several flues 7 terminate at a point substantially on a line with the upper edges of the walls 1 and 2 (see Fig. 1). Coöperating with each of the flues 7 and disposed adjacent thereto is a flue 8. Said flues 8 are constructed similar to the flues 7 and constitute the downward passes for the products of combustion issuing out of the flues 7. All of the flues 8 terminate below the ground level of the kiln and communicate in series with conduits 9 which lead to the draft stacks, not shown in the drawing. Each of the conduits 9 is provided with a damper 9' for regulating the draft. The series of flues 7 and 8 provide within the chamber a plurality of intercommunicating series of receptacles adapted to contain the finely divided ore dust which is to be reduced, and access within said receptacle is made through the arch doors 10. The floor 11 of the reducing chamber is on the same level as that of the fire-place grates.

In operation the several receptacles of the reducing chamber are charged with the ore dust and the fire-places fired. The products of combustion of the fires take substantially that course indicated by the arrows in Fig. 2, thus subjecting the ore dust to substantially the full efficiency of the several furnaces; and it is to be noted that with this arrangement the ore dust is not brought into direct contact with the heated currents which, as heretofore pointed out, the ore dust is too fine to withstand.

What is claimed is:—

1. A furnace for sintering ore dust expelled from blast-furnaces comprising a closed chamber having a series of communicating receptacles for the ore dust, a plurality of fire places arranged along either side of the chamber and adjacent thereto, and having each a flue, each of said flues comprising two independent and closed vertical passageways within the chamber, and an outlet, said flues adapted to convey the products of combustion in the manner specified.

2. A furnace for sintering ore dust expelled from blast furnaces comprising a closed chamber having a series of communicating receptacles for the ore dust, said receptacles being vertically disposed and open at the tops thereof; a plurality of fire-places arranged along either side of the chamber and adjacent thereto, and having each a flue, each of said flues comprising two independent and vertically disposed passageways open at the top and adapted to convey the products of combustion in a continuous current for approximately twice the length of said receptacles, and an outlet for one of said flues.

The foregoing specification signed at Ironton, Ohio, this 21st day of October, 1910.

HARRY C. PARKER.

In presence of—
 MORRISON W. RUSSELL,
 EDITH MAE HENRY.